C. R. STICKNEY.
UPHOLSTERY SPRING CONSTRUCTION.
APPLICATION FILED FEB. 10, 1919.
1,299,871.
Patented Apr. 8, 1919.
2 SHEETS—SHEET 1.
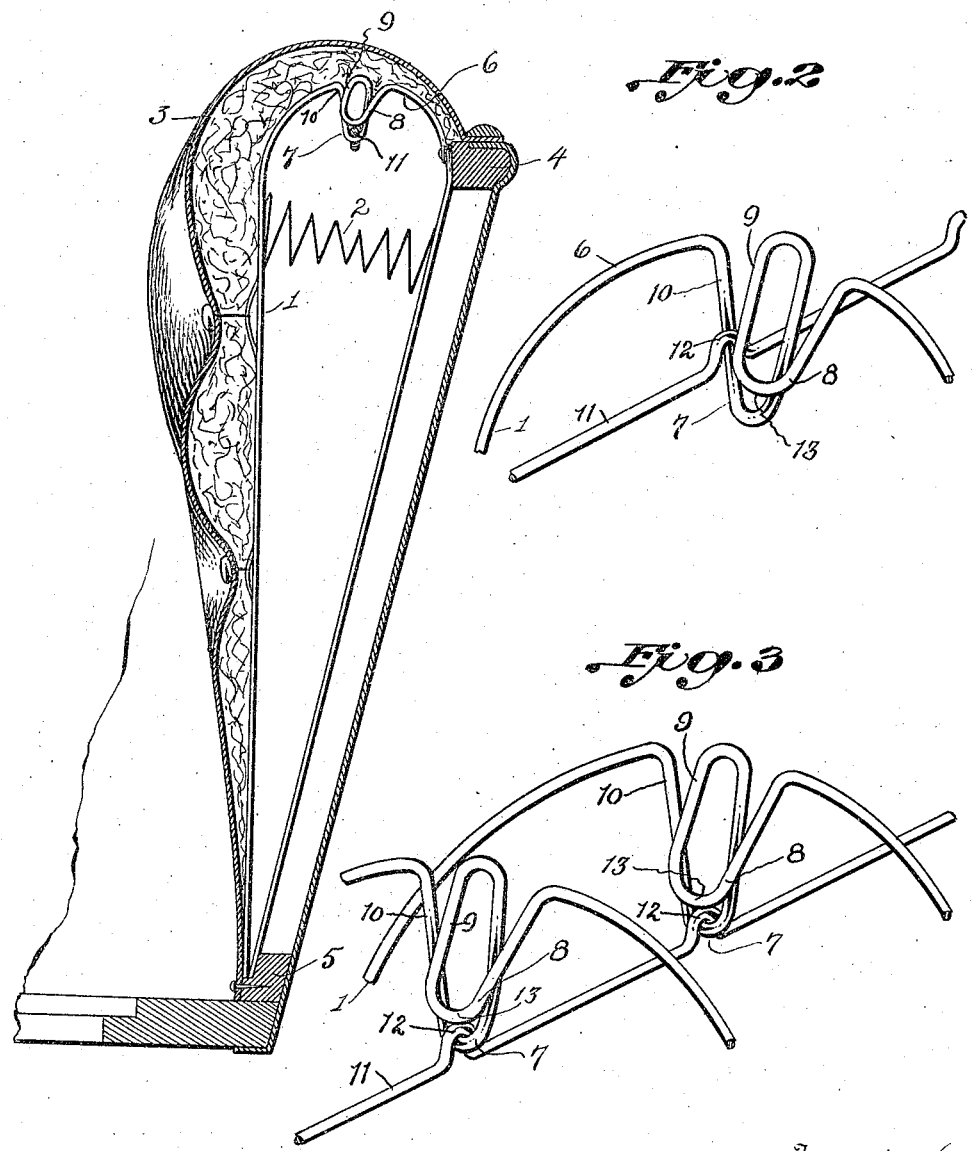
Inventor
Clement R. Stickney

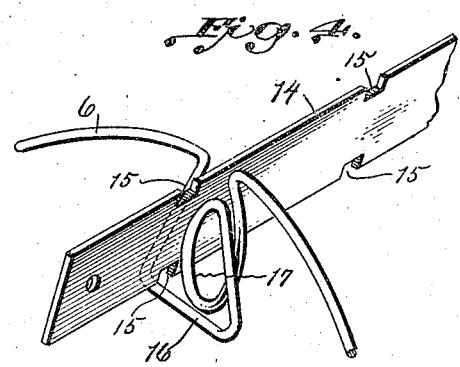
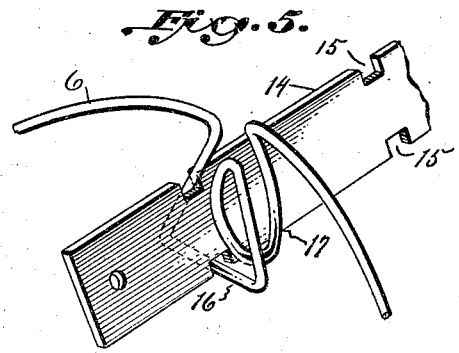
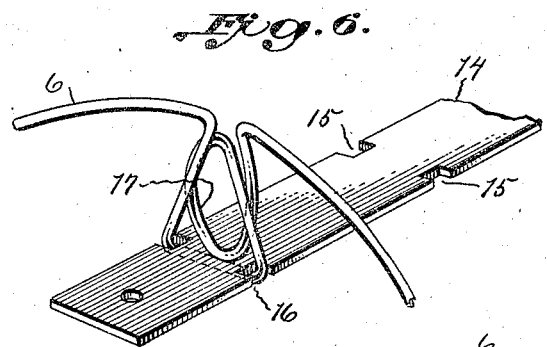
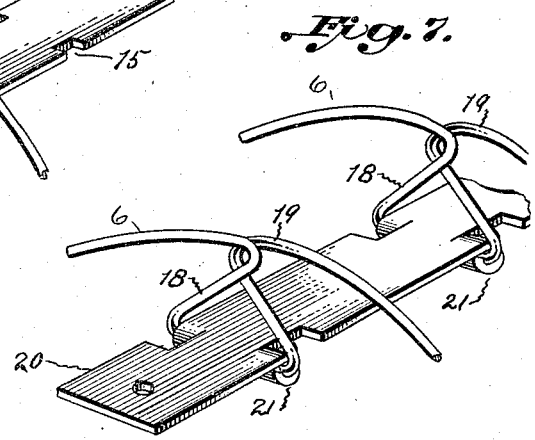
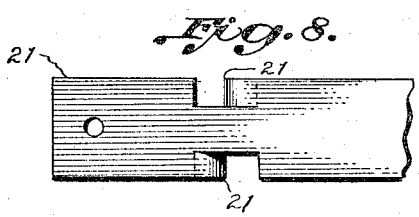

UNITED STATES PATENT OFFICE.

CLEMENT R. STICKNEY, OF DETROIT, MICHIGAN.

UPHOLSTERY SPRING CONSTRUCTION.

1,299,871.  Specification of Letters Patent.  Patented Apr. 8, 1919.

Application filed February 10, 1919. Serial No. 275,991.

*To all whom it may concern:*

Be it known that I, CLEMENT R. STICKNEY, of Detroit, Wayne county, Michigan, have invented certain new and useful Improvements in Upholstery Spring Constructions, of which the following is a specification.

In the employment of springs of any type for maintaining upholstery in desired position, it is frequently desirable to anchor or stay the members together after they have been assembled in such a position that the attaching of the staying member is a matter of some difficulty, or at least, consumes some time if the stay member has to be threaded through and between various parts of the device. In a back spring construction, where upright arches are used to carry a rounded upper edge of upholstery above the back frame, it is especially desirable to anchor the upper bends of the arches to prevent lateral movement and any stay member that is used is attached and best connected after the arches are in place. At the point of connection provision should be made to prevent inelasticity of the arches while at the same time the stay must be arranged so that it may be connected after the arches are in place, with a minimum of time, material and effort.

This invention relates to upholstery spring construction and to an arrangement of the structural parts thereof whereby a stay may be quickly applied after assembling, without threading through the members thereof and without the use of clips or like devices. In its broadest aspect, the invention contemplates means for securing transverse members of a spring construction together by forcing one member laterally sidewise into interlocked relation with the companion member.

The invention consists in the matters hereinafter set forth and more particularly pointed out in the appended claims.

In the drawings:

Figure 1 is a view in elevation and transverse section of a spring construction that embodies features of the invention mounted on a back frame;

Fig. 2 is a view in detail showing a pair of members disposed transversely to each other and arranged to interlock, with one member in initial position for insertion;

Fig. 3 is a view in detail showing the member moved into complete interlocked relation with the transverse member;

Fig. 4 is a view in detail showing a metal strip inserted in initial position for interlocking with a transversely disposed member;

Fig. 5 shows this strip further advanced into position;

Fig. 6 depicts the strip in final position;

Fig. 7 is a view of a modification of the parts; and

Fig. 8 is a view in detail of the strip indicated in Fig. 7.

Referring to the drawings, a back spring is formed, for example, of upright arches 1 disposed in the usual manner with body springs 2 and applied upholstery 3, the whole being supported on a back frame having an upper member 4 and lower member 5. As these arches are arranged in pairs or series along the back frame, it is necessary to stay them at the upper bends 6 thereof and this is usually accomplished by attaching a stay member thereto at some point of each bend. In doing this, if the strip or wire forming the arch is knotted, it produces an inelastic section in the arch which is not only deleterious to the applied upholstery but also uncomfortable to the user. Or if the bend portion 6 of each arch is arranged to form closed loops, the cross-stay member must be threaded through this loop, which is a time consuming process. In order to avoid this and at the same time maintain the resiliency of the bend 6, the strip of wire of which the arch is formed, is bent into a depending main loop 7 with open throat that is closed by an overlying guard loop 8, the latter being in about the same plane as the loop 7 or as close thereto as it can be formed, and preferably with one arm 9 thereof forming an acute outer angle with the adjacent arm 10 of the loop 7. This oblique relation of the arms 9 and 10 permits the insertion of a cross-stay 11 by lateral movement of the latter so that it assumes first the position shown in Fig. 2 and finally the place indicated in Fig. 3. The cross-stay may be crimped to form holding loops 12 that lock the stay against longitudinal movement through the lock. Furthermore the lower portion 13 of the guard loop 8 is so formed as to prevent recession of the stay.

As indicated in Figs. 4, 5, and 6, the stay may take the part or form of a seat metal band or strip 14 with notches 15 in the margins, and in such instance the arch spring is provided with a main loop having a flat base portion 16 with the overlying guard loop 17 closing the throat of the main loop. The strip may be inserted in Fig. 4, advanced to the position shown in Fig. 5, and finally brought home in the position indicated in Fig. 6 in which latter position the guard loop 17 acts as a keeper that prevents upward movement of the strip.

As a modification of this latter device, there may be a main loop 18 with a guard loop 19 closing the throat thereof, but as the guard loop does not contact directly with or lie close to the strip 20, when the latter is home, ears 21 are cut from the edge portions of the band and folded around the wire of the loop to maintain the band in position.

While this means of securing members that are transversely disposed to each other in spring construction is herein shown in connection with arch springs, it is to be understood that the same locking means may be used for holding any members together that are transversely disposed to each other in a spring construction by forming in each this guard loop across the throat of a main receiving loop, as, for example, at the juncture of two otherwise straight stay wires.

One of the main features of the invention is the ease of placing a stay wire in the structure after the rest of the parts have been assembled as it only necessitates a slight lateral movement of the stay wire and forcing apart of the guard and main loop limbs during this process of insertion. When once in position the parts are securely locked against accidental displacement.

Obviously changes in the details of construction may be made without departing from the spirit of the invention and I do not care to limit myself to any particular form or arrangement of parts.

What I claim is:

1. In an upholstery spring construction, a pair of wires in transverse relation, a main loop formed in one member having a throat into which the other member may be forced laterally into position in the loop, and a guard loop or bend formed in this first member in such relation to the main loop that it permits entrance of the second member by lateral movement into the main loop and locks the second member against withdrawal by lateral movement from the loop, the second member interlocking with the first member to prevent longitudinal movement of the second member.

2. In an upholstery spring construction, a pair of transversely disposed wires one of which has a main loop with throat spanned by a guard loop or bend that yields to permit movement of the other member laterally into engagement with the main loop and locks the latter therein against withdrawal by lateral movement from the main loop and means adapted to keep the second member from displacement longitudinally in the loop.

3. In an upholstery spring construction, a pair of transversely disposed wires, one of which is bent between the ends to form a main loop with throat closed by guard loop, the latter being proportioned to allow entrance of the second wire by lateral movement through the throat of the main loop, the second wire being bent at the place of contact with the wire of the loop to lock the second wire against longitudinal movement.

4. In upholstery spring construction means for securing a pair of members of resilient material in crossed or transverse relation comprising a main loop, or bend in one member having a throat into which the other member may be thrust laterally and a guard loop normally extending across the main bend in a plane substantially parallel to that of the main loop to close the throat thereof and being formed to yieldingly withdraw when the other transverse member is forced laterally into the main loop past the guard loop.

5. In an upholstery spring construction means for securing a pair of members of an upholstery spring construction together in transverse relation comprising a main loop formed in one member having a throat into which the other member may be forced by lateral movement of the latter, and a guard loop in such relation to the main loop that it yieldingly permits entrance of the second member and locks the latter against withdrawal by lateral movement.

6. In an upholstery spring construction a pair of crossed members one of which is bent between the ends thereof to form a main loop that is engaged near the closed end by the other member and is provided with a guard portion across the open end portion thereof adapted to permit insertion of the second member by lateral movement into the main loop and to prevent withdrawal of the second member from the main loop by a similar lateral movement.

7. In an upholstery spring construction for the backs of seats, upright arch springs each provided in a crowned upper portion thereof with a main loop and a guard loop normally extending across the throat of the main loop in a plane substantially parallel to the plane thereof, for closing the throat of the main loop and a stay member transversely disposed to the arches and adapted to be moved between the guard and the main loops into the lower portions of the main loops where it is secured by the guard loops when the latter are in normal position.

8. In an upholstery spring construction, members arranged in the same general direction in the structure, and each provided with a main loop and a guard loop normally extending across the throat of the main loop, and a cross-member transversely disposed to the other members and secured in the main loops thereof against lateral movement by the guard loops.

9. In an upholstery spring construction, members arranged in the same general direction in the structure, and each provided with a main loop and a guard loop normally extending across the throat of the main loop, and a cross-member transversely disposed to the other members and secured in the main loop thereof by the guard loops, the cross member being formed to interlock with the loops against longitudinal movement therethrough.

CLEMENT R. STICKNEY.

Copies of this patent may be obtained for five cents each, by addressing the "Commissioner of Patents, Washington, D. C."